(12) United States Patent
Kang

(10) Patent No.: US 6,295,144 B1
(45) Date of Patent: Sep. 25, 2001

(54) PRE-SCANNING METHOD AND APPARATUS FOR SHUTTLE SCANNING SYSTEM

(75) Inventor: Sung-Wook Kang, Kyungki-do (KR)

(73) Assignee: SamSung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/074,397

(22) Filed: May 8, 1998

(30) Foreign Application Priority Data

May 8, 1997 (KR) .................................................. 97/17570

(51) Int. Cl.$^7$ ...................................................... H04N 1/04
(52) U.S. Cl. .......................... 358/498; 358/474; 358/487; 358/496; 358/497
(58) Field of Search .................................. 358/487, 506, 358/496, 497, 498, 474, 505

(56) References Cited

U.S. PATENT DOCUMENTS

| | | | |
|---|---|---|---|
| 4,757,348 | * | 7/1988 | Rourke et al. ............................ 355/6 |
| 4,814,798 | | 3/1989 | Fukae et al. . |
| 4,839,741 | | 6/1989 | Wilson . |
| 5,114,139 | * | 5/1992 | Kodama .................................. 355/75 |
| 5,119,213 | | 6/1992 | Graves et al. . |
| 5,128,777 | | 7/1992 | Uno . |
| 5,513,017 | * | 4/1996 | Knodt et al. .......................... 358/471 |
| 5,532,825 | | 7/1996 | Lim et al. . |
| 5,719,386 | | 2/1998 | Hsieh et al. . |
| 5,781,314 | * | 7/1998 | Mochizuki ............................. 358/509 |
| 5,786,590 | * | 7/1998 | Lin ...................................... 250/208.1 |
| 5,798,522 | * | 8/1998 | Lin ........................................ 250/234 |
| 5,894,355 | * | 4/1999 | Lin ........................................ 358/496 |
| 6,043,866 | * | 3/2000 | Kawai et al. ........................... 355/77 |

* cited by examiner

Primary Examiner—Cheukfan Lee
(74) Attorney, Agent, or Firm—Robert E. Bushnell, Esq.

(57) ABSTRACT

A pre-scanning apparatus and process using a shuttle scanning system by inserting a document into a sheet carrier of transparent material; pre-scanning the sheet carrier holding the document; and feeding the sheet carrier back. In addition, a pre-scanning method for a shuttle scanning system includes the steps of forwarding a document in response to an applied scanning signal and pre-scanning the document by a low resolution; discharging the document via a feed roller after pre-scanning; re-inserting the discharged document into a paper feeding part; and transferring and scanning the document re-inserted into the paper feeding part.

15 Claims, 6 Drawing Sheets

PRE-SCANNING METHOD AND APPARATUS FOR SHUTTLE SCANNING SYSTEM

CLAIM OF PRIORITY

This application makes reference to, incorporates the same herein, and claims all benefits accruing under 35 U.S.C. §119 from an application for PRE-SCANNING METHOD FOR SHUTTLE SCANNING SYSTEM earlier filed in the Korean Industrial Property Office on the $8^{th}$ day of May 1997 and there duly assigned Serial No. 17570/1997.

BACKGROUND OF THE INVENTION

1. Field of the Invention

The present invention relates to shuttle scanning systems, generally, and, more particularly, to pre-scanning for a shuttle-scanning process and apparatus in order to preclude a scan creation of a gap by scanning a document with a carrier sheet or by scanning only the document during recirculation of the document.

2. Discussion of Related Art

In recent years, several office automation machines have been combined into one system. Remarkable progress has been made toward the development of a multi-tasking system by combining a printer, a facsimile machine, a scanner, together with other components of image formation equipment. Exemplary practice in the art is found in the structure illustrated by the Image Reproducing Apparatus With CCD Scanner And Bubble Jet Printer Simultaneously Driven By A Common Belt In Opposite Directions And Operated Asynchronously of Charles D. Wilson, U.S. Pat. No. 4,839,741, and the Scanner Document Absence Code System of J. R. graves and J. E. Summers, U.S. Pat. No. 5,119,213, with the concept of making an initial "rough reading" by the Image Reading Apparatus of Teruhiko Uno, U.S. Pat. No. 5,128,777; while multi-tasking is illustrated in the Combined Electrographic Printer, Copier, And Telefax Machine With Duplex Capability of Kensuke Fukae and Shozo Kaieda, U.S. Pat. No. 4,814,798. More recent efforts in the art are found in the High Efficiency Multi-image Scan Method of Michael Hsieh, et al, U.S. Pat. No. 5,719,386 and the Add-on Scanner For Existing Ink Jet Printer of C. K. Lim, et al, U.S. Pat. No. 5,532,825. I have noticed that the art fails to adequately address the occurrence a scan gap when the document to be subjected to a normal scan is fed backwardly after completion of pre-scanning; consequently, a section of the document called a scan gap, is not available to be scanned.

SUMMARY OF THE INVENTION

It is therefore, an object of the present invention to provide an improved process and apparatus for scanning the textual content of documents.

It is another object to provide a process and apparatus enabling the scanning of the entirety of the textual content of each cut sheet of a document.

It is still another object to provide a process and apparatus able to avoid the occurrence of a scan gap during the scanning of the text of a cut sheet.

It is yet another object to provide a pre-scanning process and apparatus for a shuttle scanning system that precludes occurrence of a scan gap during subsequent scanning of the textual images borne by a cut sheet.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention contemplates a pre-scanning technique using a shuttle scanning system including the steps of inserting a document into a carrier sheet of transparent material with a recognition code; pre-scanning the document held in the carried sheet; and feeding the carrier sheet back.

According to another aspect of the present invention, a pre-scanning technique for a shuttle scanning system may forward a document in response to an applied scanning signal and pre-scanning the document with a low resolution; discharge the document via a feed roller after pre-scanning; re-insert the discharged document into a paper feeding part; and transfer and scan the document re-inserted into the paper feeding port, albeit at a higher resolution.

According to still another aspect of the present invention, a pre-scanning technique using a shuttle scanning system includes the steps of inserting either a document to be scanned or a carrier sheet holding the document into a manual feeder; forwarding a leading end of the document to a scanning starting point; scanning the leading end of the document and confinning if there is a recognition code; performing a corresponding pre-scanning in response to the existence or non-existence of the recognition code; and discharging the document after scanning.

If there is the recognition code, the scanning step includes the sub-steps of performing a pre-scanning; feeding the pre-scanned document back; setting a scanning region of the document; and scanning the document's scanning region. If there is no recognition code, the scanning step includes the sub-steps of performing a pre-scanning; discharging the document after pre-scanning; re-inserting the discharged document into a manual feeder; feeding the document to a scanning line; setting a scanning region of the document; and scanning the document's scanning region.

It is to be understood that both the foregoing general description and the following detailed description are exemplary and explanatory and are intended to provide further explanation of the invention as claimed.

BRIEF DESCRIPTION OF THE ATTACHED DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

Figure 5A:
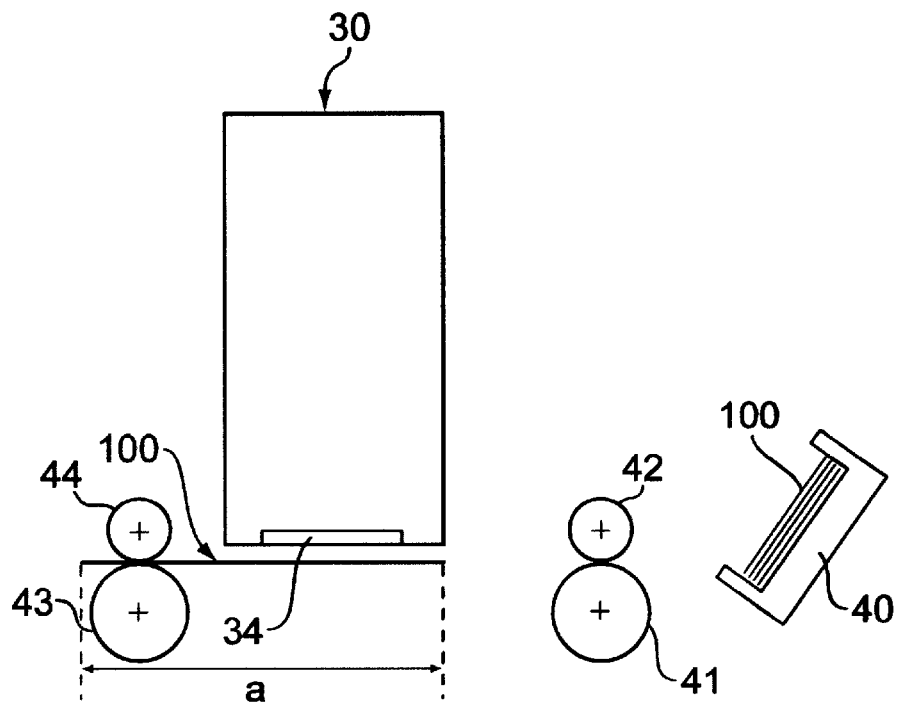
Figure 5B:
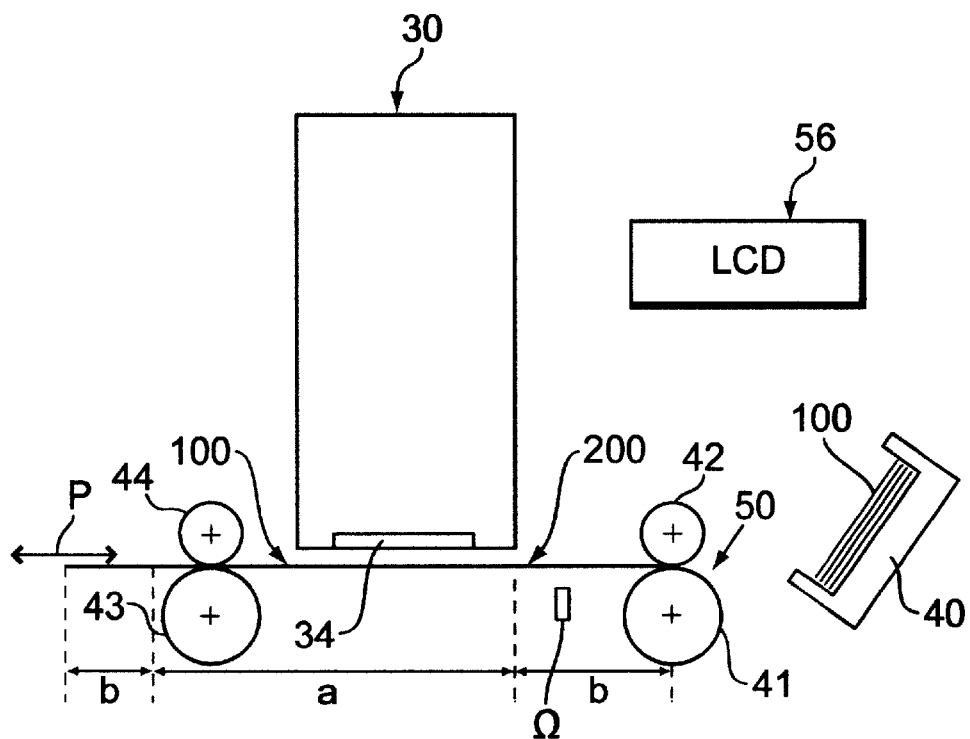
Figure 6:
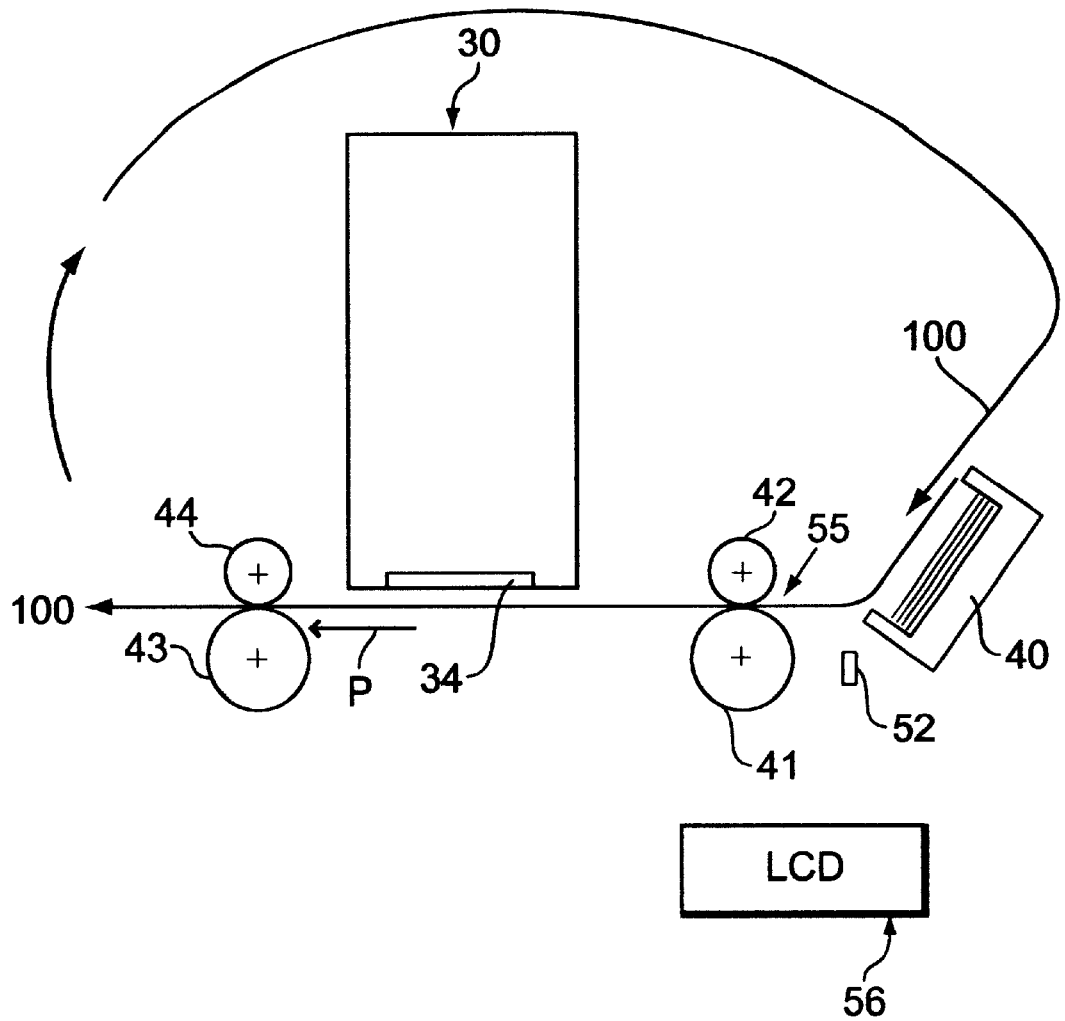
Figure 7:
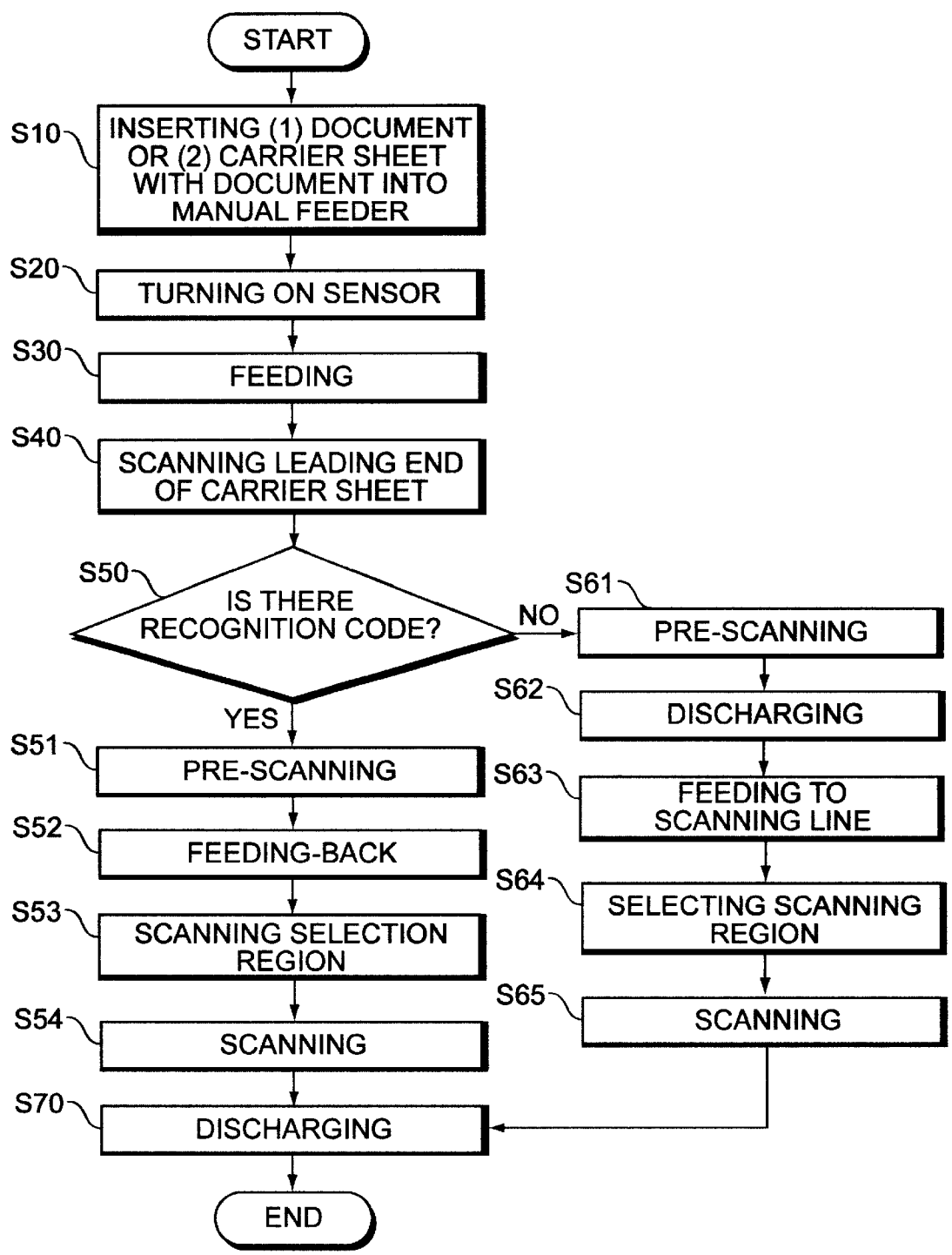

FIGS. 5a and 5b provide a comparison between the states of a single cut sheet of a document after pre-scanning in accordance with the conventional technique and in accordance with the present invention, respectively;

FIG. 6 schematically depicts the operating process of a second embodiment practiced in accordance with the principles of the present invention; and FIG. 7 depicts the control sequence of pre-scanning as practiced in accordance with the principles of the present invention.

DETAILED DESCRIPTION OF PREFERRED EMBODIMENTS

Figure 1:
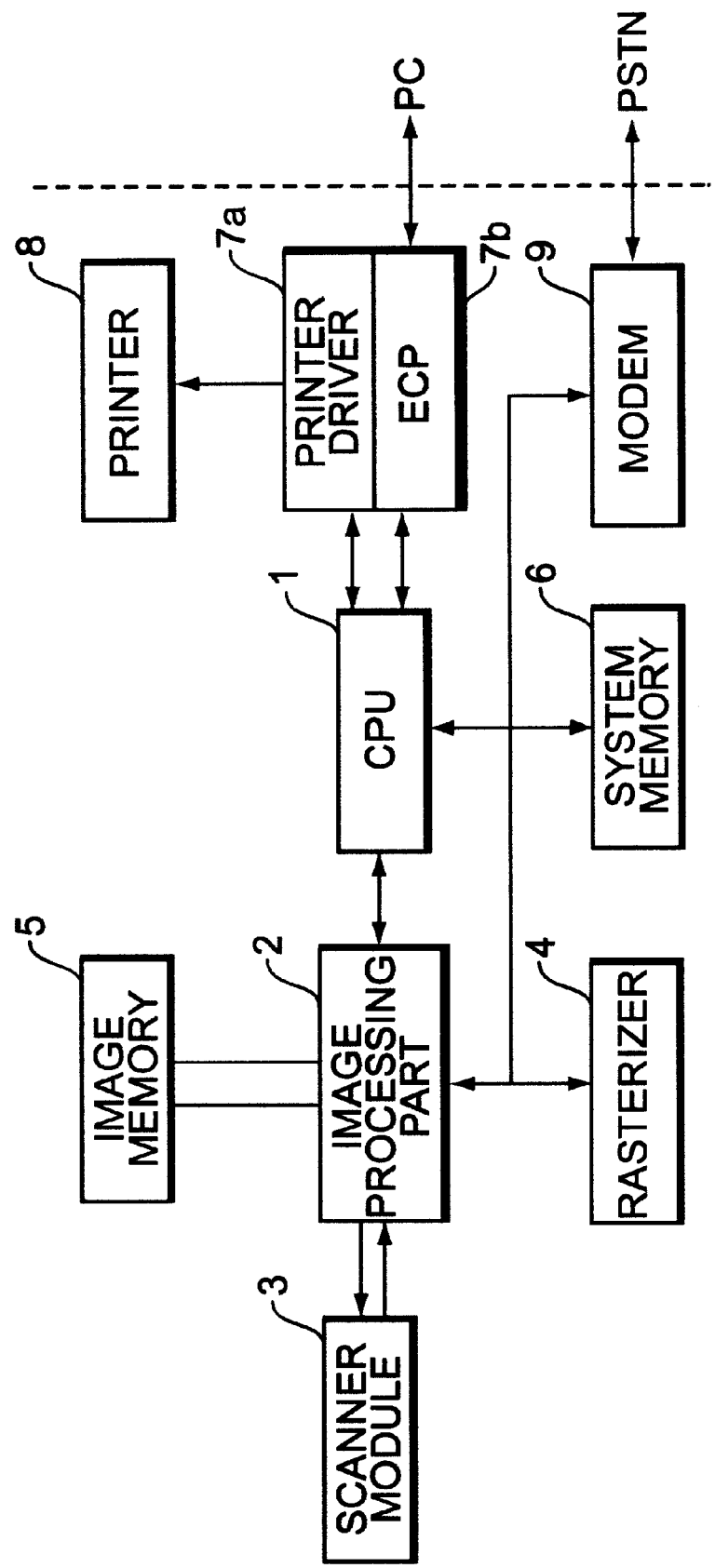
FIG. 1 is a block diagram illustrating the salient features of a multi-tasking system suitable for use in the practice of the present invention.

FIG. 1 is a schematic block diagram of a multi-tasking system using a central processing unit (CPU) 1 to supervise the operation of the multi-tasking system during image scanning and image formation generally. Memory 6 holds a program driving the overall system while image processing unit or part 2 which controls image data input from a shuttle scanner module 3 under the control of CPU 1, as well as the shading, gamma correction, dot per inch (DPI) conversion, edge emphasis, error diffusion and other characteristics of the images derived from the image data. Modem 9 modulates or demodulates the processed image data under the control of CPU 1 while ECP 7b controls the printing of images by printer 8 under the direct control of a personal computer that is coupled to the system via ECP 7b.

This multi-tasking system also will typically use rasterizer 4 in order to rasterize image data in blocks. Image memory 5 serves as a buffer memory used for processing image data. System memory 6 may use an erasable and programmable read only memory (i.e., an EPROM) to hold the overall system program. A static random access memory (i.e., a SRAM) may be used for processing system data. Printer driver 7a contols the operation of a print head, a carriage motor, and a line feed motor, as well as the actual printing by printer 8 of images corresponding to the image data. ECP 7b is a module that serves as an interface enabling a direct parallel interface to be established between the system and a personal computer; ECP 7b either transmits scanned data to the personal computer (PC) or receives data from the personal computer.

Figure 2:
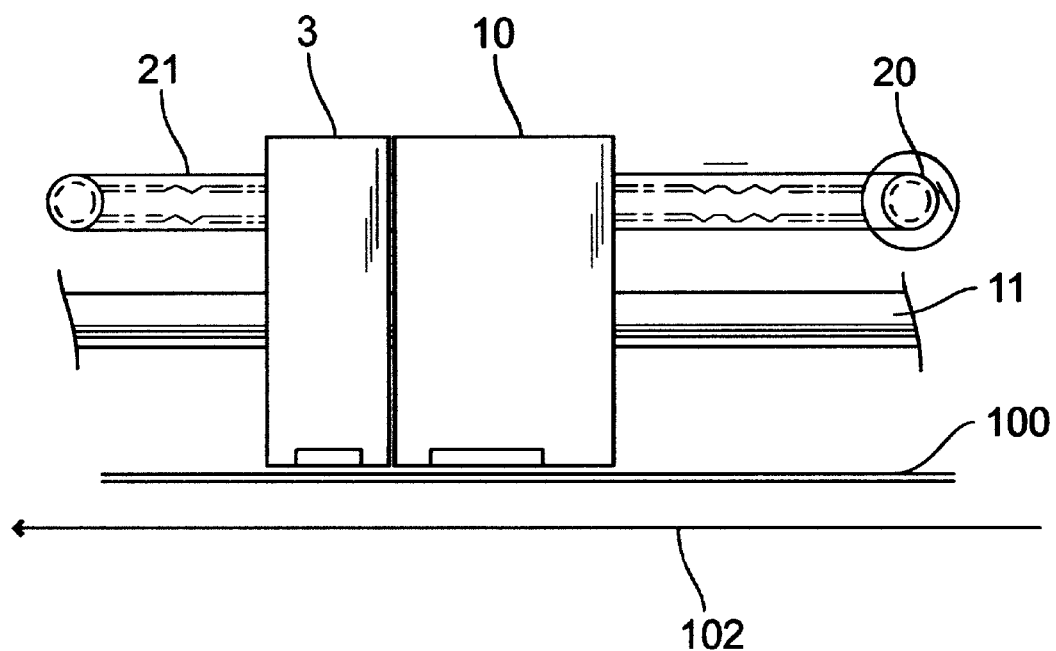
FIG. 2 depicts the details of the construction of the conventional multi-tasking system shown in FIG. 1.
Figure 3:
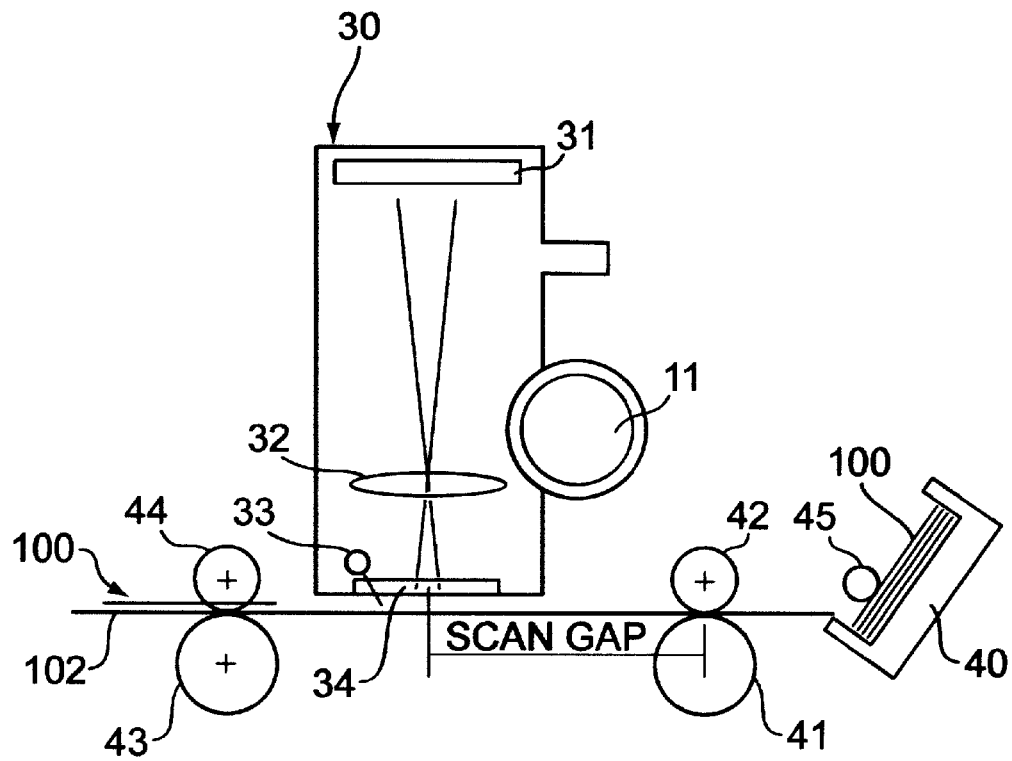
FIG. 3 is a side view of the scanning process followed by the conventional multi-tasking system shown in FIG. 1.

The overall operation of a conventional multi-tasking system may be described by reference to FIG. 2, where scanner module 3 and a printer module 10 each are simultaneously driven by a single timing belt 21 and carriage return motor 20 to reciprocally slide along a horizontal moving shaft 11 in opposite directions transverse to the path of travel of sheet 100 through the system. A single cut sheet 100 of a document is fed along a path of conveyance 102 and discharged by line feed roller driven by the operation of a line feed motor (neither of which are shown in FIG. 2). FIG. 3 is a side view of the shuttle scanner module suitable for use with a multi-tasking system. The shuttle scanner module may use the same driving system as that of an ink-jet head module, with scanner module 3 and printer module 10 being each coupled to timing belt 21 and moved alternately to the right and left along the surface of each sheet of the document by carriage return motor 20 during either the reading or the printing of images. Document 100 is withdrawn from a paper cassette 40 holding a stack of cut sheets by roller 45, to be conveyed in a forward direction along path 102 past scan mechanism 30 and toward feed roller 43 while interposed between drive roller 41 and pinch roller 42, and then by feed roller 43. After scanner module 3 completes the scanning process, document 100 is discharged by the applied rotational force of feed roller 43 and pinch roller 44. During operation of the print mechanism, ink particles of ink from the ink-jet head of printer module 10 are sprayed onto the exposed surface of document 100 while scanner module 3 and printer module 10 are moved alternately to the right and the left. During operation of scan mechanism 30 of scan module 3, a lamp 33 mounted in scanner module 3 applies light to document 100 while scanner module 3 and printer module 10 are moved alternately to the right and to the left. The light that is reflected from the surface of document 100 corresponds to the images borne by the document (and thus may be converted into image data for each sheet of the document), reflects from the text-bearing surface of document, passes through scanner glass 34, permeates a double convex lens 32, and is focused onto a charge coupled device (CCD) 31 that directly reads the images borne by document 100; that is, charge coupled device 31 converts those images into corresponding image data. A large memory capacity (e.g., for a document with standard paper A4 dimensions, that is, a capacity greater than about 40 Megabytes) is required for converting an image into image data, a time consuming process. Therefore, a pre-scan mechanism has recently been proposed and is widely used in laser scanners. These pre-scan mechanisms scans image data borne by the overall document at a relatively low resolution of about seventy-five dots per inch (75 dpi resolution), and a part of the resulting scanned image data may subsequently at the option of the user of the system, on the basis of the image projected onto the screen of the personal computer, be selected by the user and designated for scanning at a higher resolution. I have found however, that when the document is fed backwardly toward drive roller 41 after pre-scanning, a section of the document called a scan gap, is not available to be scanned.

A linear representation of the scan gap is illustrated by FIG. 3. During pre-scanning in conventional practice of the art, the document is first conveyed by drive roller 41 and pinch roller 42. The document is next held in the nip between feed roller 43 and pinch roller 44 to provide a linear force for feeding the document backwardly toward drive roller 41 in preparation for a subsequent high resolution scanning. Due to the relative shortness of the length of each sheet of paper relative to the distance of separation between the nip formed between feed roller 43 and pinch roller 44, and the nip formed between drive roller 41 and pinch roller 42, I have found that there is a limit to a distance by which the document may be fed backwardly in preparation for scanning at a higher resolution (or alternately, during scanning while the sheet is conveyed backwardly). The document is inserted into the nip between feed roller 43 and pinch roller 44 in order to apply a force to the document and thereby propel the document for normal scanning and discharge. I have noticed that consequently, a region of the surface of the document is reduced. Thus, the conventional technique unfortunately leaves a scan gap as a concomitant incident of the pre-scanning.

Figure 4:
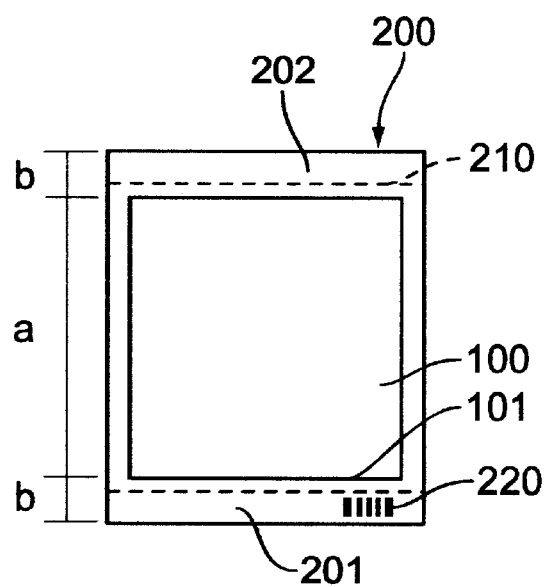
FIG. 4 is a plan view of a sheet carrier arranged in accordance with a first preferred embodiment of the present invention.

Reference will now be made to the details of the preferred embodiments of the present invention, examples of which are illustrated in the accompanying drawings labeled as FIGS. 4 through 7. FIG. 4 illustrates a plan view of a relatively thin sheet carrier 200 formed of a material that is transparent to the text and images borne on the surface of a sheet of printed media. Sheet carrier 200 forms a space (i.e., a pocket or open receptacle) into which a document 100 may be inserted, and is provided with a joint 210 with each of the upper and lower ends 201 and 202 of sheet carrier 200 for preventing displacement or dislocation of document 100 while transported by carrier 200. A machine readable pre-scan recognition code 220, such as a bar code, may be attached to the upper end 201 of the transparent sheet carrier (i.e., to that portion of the sheet carrier that advances through the system before the leading edge of document 100). Pre-scanning with document 100 enclosed in a sheet carrier includes the steps of inserting sheet carrier 200 holding document 100 through a paper feeding port; recognizing the presence of pre-scan recognition code 220 along sheet carrier 200's upper end 201; performing the pre-scanning of the text and other images borne on the surface of document 100; actuating a drive roller 41 to feed sheet carrier 200 and document 100 backwardly; and performing the normal scanning of document 100 within a preset or a designated scanning region. The present invention employs sheet carrier 200, and this contributes to a difference between the results obtained in the conventional practice in the art and with the practice of the present invention at the point of feeding document 100 backwardly after completion of the pre-scanning operation, in preparation for a higher resolution scanning. According to the conventional practice in the art, document 100 is merely inserted between a feed roller 43 and a pinch roller 44 and moved toward drive roller 41. Referring to FIG. 4, (a) is defined as the length of a cut sheet of a printed medium such as a cut sheet of paper, and the overall length (a+2b) of sheet carrier 200 includes paper length (a), (or, alternatively, the constant (a) is set approximately equal to the length of document 100), and the aggregate length (2b) of the upper and lower ends 201 and 202 respectively, of carrier 200. The lower end 202 of sheet carrier 200 is inserted into the nip between drive roller 41 and pinch roller 42 at the point of pre-scanning. This allows to actuate drive roller 41 and pinch roller 42 to advance sheet carrier 200 and precludes the occurrence of the scan gap problem illustrated by FIG. 3 when feeding sheet carrier 200 backwardly through drive roller 41 and pinch roller 42 in preparation for scanning at a higher resolution.

FIGS. 5a and 5b depict the states of linear disposition of a document 100 after pre-scanning in accordance with the exemplary conventional technique and of linear disposition of a document 100 held by a sheet carrier 200 after pre-scanning in accordance with the principles of the present invention, respectively. As shown in FIG. 5a, according to the conventional practice in the art, document 100 with a length (a) is held between feed roller 43 and pinch roller 44, thus causing the scan gap problem illustrated by FIG. 3. Referring to FIG. 5b however, in the practice of the present invention, sheet carrier 200 is held between drive roller 41 and pinch roller 42 as the sheet carrier 200 is propelled backwardly in preparation for higher resolution scanning, thereby avoiding occurrence of the scan gap illustrated by FIG. 5a.

In accordance with a second preferred embodiment of the present invention, as shown in FIG. 6, the scanned document is discharged without backward feeding, and then inserted again into the paper feeding port for scanning. That is, the second preferred embodiment of the present invention includes the steps of feeding document 100; performing a pre-scanning of the text and images borne by document 100; discharging document 100; re-feeding document 100 (by, for example, re-inserting document 100 into the path of conveyance, or alternatively, conveying document 100 along a path of travel around the ambit of scanning mechanism 30); and then performing the normal scanning, albeit at a higher resolution.

FIG. 7, also with reference to FIGS. 4, 5B and 6 depicts the control sequence of pre-scanning performed in accordance with the principles of the present invention, and this control sequence is generally applicable of both the first and second preferred embodiments of the present invention.

The control sequence of pre-scanning includes the steps of inserting (S10) either document 100 or sheet carrier 200 bearing document 100 into a manual feeder 50; sensing (S20) that the document 100 is inserted to the manual feeder 50 by detecting the presence of the document with a feed sensor 52 mounted within the system along the path of conveyance P; forwarding (S30) document 100 until its leading end 101 reaches the scanning start point; scanning (S40) the leading end 101 of document 100 or alternatively, scanning the leading end 201 of sheet carrier 200; confinning (S50) the presence of a recognition code borne by the leading end 201 of sheet carrier 200; performing (S51) pre-scanning of document 100 being transported by sheet carrier 200 if the recognition code has been detected; performing (S52) the backwards conveyance at the point of completing the pre-scanning; setting (S53) or otherwise designating a scanning region by the use of a personal computer; performing (S54) the higher resolution scanning of the designated region; and discharging (S70) document 100 to the outside of the scanner. During the feeding back step (S52), document 100 is retracted via the rotary motion of drive roller 41 and pinch roller 42, thereby preventing a scanning jam.

The control sequence of pre-scanning, referring particularly to FIGS. 4, 6 and 7, also includes the steps of performing (S61) the pre-scanning if no recognition code is detected in step (S50); discharging (S62) document 100 by the linear force imparted to the document by the rotation of feed roller 43 and pinch roller 44; re-inserting (S63) document 100 into the paper feeding port 55 after pre-scanning; forwarding (S63) the leading end 101 of document 100 to an initial scanning line by the linear motion imparted to document 100 by the rotation of drive roller 41 and pinch roller 42; setting (S64) or otherwise designating a scanning region by the use of the personal computer; performing (S65) the normal scanning (albeit at a higher resolution than the pre-scanning); and discharging (S70) document 100 after completion of the normal scanning of its textual contents.

In step (S61), after pre-scanning, preferably, a message advising the user of the system of the availability of document re-insertion for normal or higher resolution scanning may be displayed on a liquid crystal display (LCD) 56 of the scanner, and may be also broadcast to a user by using a human voice or other sound.

The above two methods may be properly used according to circumstances. It is advantageous to use the method with the sheet carrier when scanning either an important document that should not be contaminated or paper that is not easily conveyed for scanning. It is preferable to use the techinque employing direct conveyance of the document only when the sheet carrier is lost or the document is too thick to be inserted into the sheet carrier.

As described above, the present invention may perform the pre-scanning all over the document, and prevents a scan gap problem that may occur during pre-scanning.

What is claimed is:

1. A pre-scanning method for a shuttle scanning system, comprising the steps of:

inserting a document into a sheet carrier of transparent material with the sheet carrier having a leading edge that is not co-extensive with the document;

recognizing if a pre-scan recognition code for performing a corresponding pre-scanning of the document is present on the sheet carrier;

pre-scanning the document held by the sheet carrier while advancing the sheet carrier in a first direction through said shuttle scanning system with said leading edge of the sheet carrier preceding the document when the pre-scan recognition code is present on the sheet carrier; and feeding the sheet carrier backwardly through said shuttle scanning system in a second and opposite direction to the first direction after said pre-scanning to prepare for normal scanning of the document within a designated scanning region.

2. The pre-scanning method for a shuttle scanning system according to claim 1, further comprised of the sheet carrier bearing a machine readable pre-scan recognition code, and performing a corresponding pre-scanning of the document based upon the machine readable pre-scan recognition code.

3. The pre-scanning method for a shuttle scanning system according to claim 2, further comprised of the machine readable pre-scan recognition code being a bar code.

4. The pre-scanning method for a shuttle scanning system according to claim 1, further comprised of the sheet carrier including an upper end, a lower end and a space for the document located between the upper end and the lower end, the upper end and the lower end having an aggregate length so that the sheet carrier is longer than the document to allow data in a section of a scan gap to be read out during scanning.

5. The pre-scanning method for a shuttle scanning system according to claim 4, further comprised of the sheet carrier having a joint at each of the upper end of the sheet carrier and the lower end of the sheet carrier for preventing the document from being dislocated.

6. A pre-scanning method for a shuttle scanning system, comprising the steps of:

forwarding a document in response to an applied scanning signal and pre-scanning the document at a low resolution;

discharging the document via a feed roller after pre-scanning the document;

re-inserting the discharged document into a paper feeding part in order to perform normal scanning of the document; and transferring on a path of conveyance and scanning the document re-inserted into the paper feeding part to perform normal scanning of the document at a higher resolution than the low resolution used for pre-scanning the document.

7. The pre-scanning method for a shuttle scanning system according to claim 6, further comprised of a message of document re-insertion being given to a user via a liquid crystal display panel after pre-scanning to advise the user of the availability of re-inserting the discharged document into the paper feeding part for normal scanning of the document at the higher resolution.

8. A pre-scanning method for a shuttle scanning system, comprising the steps of:

inserting one of a document to be scanned and a sheet carrier holding the document into a manual feeder of said shuttle scanning system;

forwarding one of a leading end of the document and a sheet carrier holding the document to a scanning starting point;

scanning to the leading end of the document and making a determination about a presence of a pre-scan recognition code for performing a corresponding pre-scanning of the document;

performing a corresponding pre-scanning and then a normal scanning of images borne by the document in dependence upon said determination about a presence of a pre-scan recognition code; and discharging the document after completion of scanning of images borne by the document.

9. The pre-scanning method for a shuttle scanning system according to claim further comprised of when the pre-scan recognition code is present, the step of performing a corresponding pre-scanning and then a normal scanning of images borne by the document includes the sub-steps of:

performing a pre-scanning of the document;

feeding the pre-scanned document back to prepare for the normal scanning of the document;

setting a scanning region of the document for the normal scanning of the document; and scanning the scanning region of the document to perform the normal scanning of the document.

10. The pre-scanning method for a shuttle scanning system according to claim 8, further comprised of when the pre-scan recognition code is absent, the step of performing, a corresponding pre-scanning and then a normal scanning of images borne by the document includes the sub-steps of:

performing a pre-scanning of the document;

discharging the document after pre-scanning the document;

re-inserting the discharged document into a manual feeder;

feeding the document from the manual feeder to a scanning line;

setting a scanning region of the document; and scanning the scanning region of the document to perform the normal scanning of the document.

11. A shuttle scanning system for scanning a document, comprising:

a sheet carrier of transparent material for receiving a document to be scanned by the shuttle scanning system, said sheet carrier having a pre-scan recognition code for performing a corresponding pre-scanning of the document;

means for performing the corresponding pre-scanning of the document according to the pre-scan recognition code; and means for performing a normal scanning of the document within a designated scanning region of the document.

12. A document carrier for a shuttle scanning system, comprising:

a sheet carrier of transparent material for receiving a document the sheet carrier including an upper end, a lower end and a space for the document located between the upper end and the lower end, the upper end and the lower end having an aggregate length so that the sheet carrier is longer than the document to be received in the sheet carrier to allow data in a section of a scan gap to be read out during scanning of the document; and a pre-scan recognition code for performing a corresponding pre-scanning of the document to be received in the sheet carrier, the pre-scan recognition code being located on the sheet carrier.

13. The document carrier according to claim 12, further comprised of the sheet carrier having a joint at each of the upper end of the sheet carrier and the lower end of the sheet carrier for preventing the document to be received in the sheet carrier from being dislocated.

14. The document carrier according to claim 13, further comprised of the pre-scan recognition code being a machine readable pre-scan recognition code.

15. The document carrier according to claim 12, further comprised of the pre-scan recognition code being a machine readable pre-scan recognition code.

* * * * *